(12) United States Patent
Machl et al.

(10) Patent No.: US 8,304,049 B2
(45) Date of Patent: Nov. 6, 2012

(54) β-NUCLEATED POLYPROPYLENE COMPOSITION

(75) Inventors: Doris Machl, Linz (AT); Bo Malm, Espoo (FI); Franz Ruemer, St. Georgen/gusen (AT); Klaus Bernreitner, Linz (AT)

(73) Assignee: Borealis Technology Oy, Porvoo (FI)

( * ) Notice: Subject to any disclaimer, the term of this patent is extended or adjusted under 35 U.S.C. 154(b) by 429 days.

(21) Appl. No.: 12/452,627

(22) PCT Filed: Jun. 30, 2008

(86) PCT No.: PCT/EP2008/058355
§ 371 (c)(1),
(2), (4) Date: Mar. 8, 2010

(87) PCT Pub. No.: WO2009/007263
PCT Pub. Date: Jan. 15, 2009

(65) Prior Publication Data
US 2010/0285251 A1    Nov. 11, 2010

(30) Foreign Application Priority Data
Jul. 12, 2007  (EP) .................................. 07013695

(51) Int. Cl.
*B29D 22/00* (2006.01)
*B29D 23/00* (2006.01)
*B32B 1/08* (2006.01)
*B29C 47/00* (2006.01)

(52) U.S. Cl. .................. 428/36.9; 428/35.7; 428/36.92; 428/500; 525/240; 525/191; 525/55; 525/52; 524/528; 264/209.1; 264/540

(58) Field of Classification Search ................ 428/35.7, 428/36.9, 36.92, 500; 525/240, 191, 55, 525/52; 524/528; 264/209.1, 540
See application file for complete search history.

(56) References Cited

U.S. PATENT DOCUMENTS

| | | |
|---|---|---|
| 2005/0182175 A1 | 8/2005 | Busch et al. |
| 2006/0167141 A1 | 7/2006 | Dolle et al. |
| 2006/0177632 A1 | 8/2006 | Jacoby |

FOREIGN PATENT DOCUMENTS

| | | |
|---|---|---|
| EP | 1 006 149 A | 6/2000 |
| EP | 1 344 793 A | 9/2003 |
| EP | 1 448 631 B1 | 1/2006 |
| EP | 1 724 303 A1 | 11/2006 |
| EP | 1 881 027 A1 | 1/2008 |
| EP | 1 887 034 A1 | 2/2008 |
| WO | WO 2007/149900 | 12/2007 |
| WO | WO 2009/007263 | 1/2009 |

OTHER PUBLICATIONS

Menyhard A. et al: "Polymer blends based on the beta-modification of polypropylene" European Polymer Journal, Pergamon Press Ltd., Oxford, GB.; vol. 41, No. 4, Apr. 2005, pp. 669-677, XP004732854; ISSN: 0014-3057; the whole document.
Zheng Q. et al.: "Structure, morphology and non-isothermal crystallization behavior of polypropylene catalloys"; Polymer, Elsevier Science Publishers B.V., GB; vol. 46, No. 9, Apr. 15, 2005, pp. 3163-3174, XP004810437; ISSN: 0032-3861; the whole document.

*Primary Examiner* — Michael C Miggins
(74) *Attorney, Agent, or Firm* — Warn Partners, P.C.

(57) ABSTRACT

Polypropylene composition comprising a propylene homopolymer (A) and a random propylene-butene copolymer (B) or a random propylene-ethylene copolymer (B') wherein the polypropylene composition is β-nucleated.

18 Claims, No Drawings

β-NUCLEATED POLYPROPYLENE COMPOSITION

This application is a National Stage of International Application No. PCT/EP2008/058355, filed Jun. 30, 2008. This application claims priority to European Patent Application No. 07013695.7 filed on Jul. 12, 2007. The disclosures of the above applications are incorporated herein by reference.

The present invention relates to a new polypropylene composition, its manufacture and its use as well as to pipes and cables comprising said new polypropylene composition.

Polypropylene-based polymers have many characteristics which make them suitable for a number of applications like cables, pipes, fittings, moulded articles, foams etc. Polypropylene as pipe material is mainly used in non-pressure applications, like for cable protection as well as for culverts (e.g. road and rail), fittings and profiles. Polypropylene is also used for pressure pipes, mainly for hot water and industrial pipes, i.e. for the transport of liquid, e.g. water, during which the fluid can be pressurized. Moreover, the transported fluid may have varying temperatures, usually within the temperature range of about 0 to about 70° C. The good properties at high temperature of polypropylene compared to other polyolefins are often utilized for pipe applications but also for cable applications. All three main types of propylene polymers, i.e. homopolymers, random copolymers and block copolymers (i.e. heterophasic copolymers) are used.

In general, polypropylene-based materials to be chosen for pipe and cable applications should result in products of excellent pressure test performance as well as high impact performance while still maintaining good stiffness. However, these properties are interrelated to each other and very often behave in a conflicting manner, i.e. improving a specific property can only be accomplished on the expense of another property.

Stiffness can be improved by increasing the amount of homopolymer within the composition. As a consequence, the material becomes more brittle, thereby resulting in poor impact properties. Furthermore, high brittleness is usually accompanied by lower resistance to slow crack growth, thereby having a detrimental effect on durability.

Thus many efforts have been undertaken to provide pipes and cables which are characterized by a good pressure test performance, i.e improved stress crack resistance and hence resistance to brittle failure. However to date it was impossible to improve the pressure test performance without deteriorating other important properties of the pipe or cable, like the stiffness or the impact strength of the pipe or cable.

For instance WO 2003/037981 A1 is directed to pipe systems comprising a polymer composition of propylene copolymer with a C4-C10 α-olefin as comonomer and an ethylene-propylene rubber. Such compositions have very low stiffness (see example 2 and 3 of the international application) and also the pressure test performance is unsatisfying (see table 5 of the instant invention).

Thus the object of the present invention is to provide a polymer composition which enables the manufacture of pipes with an excellent pressure test performance by keeping the stiffness as well as the impact strength on high levels. Moreover the present invention is directed to pipes and cables with the aforesaid properties.

The finding of the present invention is to provide a β-nucleated polypropylene composition of a homopolymer component and a copolymer component, wherein preferably the β-nucleation takes predominantly place in the homopolymer part.

Thus the present invention is directed to a propylene composition comprising
(a) a propylene homopolymer (A) and
(b) a propylene-butene copolymer (B) or a propylene-ethylene copolymer (B'), preferably a random propylene-butene copolymer (B) or a random propylene-ethylene copolymer (B') with an ethylene content not exceeding 3.0 wt.-%,
wherein the polypropylene composition is β-nucleated.

The invention can be alternatively defined by a propylene composition comprising
(a) a propylene homopolymer (A) and
(b) a propylene-butene copolymer (B) or a propylene-ethylene copolymer (B'), preferably a random propylene-butene copolymer (B) or a random propylene-ethylene copolymer (B') with an ethylene content not exceeding 3.0 wt.-%,
wherein the polypropylene composition is at least partially, preferably at least to 50%, crystallized in the β-modification.

Surprisingly it has been found out that with said polymer compositions pipes are obtainable having superior pressure test performance compared to pipes being state of the art. Moreover not only the pressure test performance of the pipes based on the inventive polymer composition is outstanding but additionally also the stiffness and the impact performance of the pipe and the polypropylene composition are excellent. In particular the notched impact strength at low temperatures and the flexural modulus are above average (table 6).

The present invention demands three requirements for the propylene composition (propylene homopolymer (A); copolymer (B) or (B'), β-modification), which are described in the following in more detail.

First the polypropylene composition must comprise a propylene homopolymer (A). The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable. The comonomer content can be determined with FT infrared spectroscopy, as described below in the examples.

Even more preferred the propylene homopolymer is an isotactic propylene homopolymer. Thus it is preferred that the propylene homopolymer has a rather high pentad concentration, i.e. higher than 90%, more preferably higher than 92%, still more preferably higher than 93% and yet more preferably higher than 95%.

Moreover the propylene homopolymer (A) can be unimodal or multimodal, like bimodal. However it is preferred that the propylene homopolymer (A) is unimodal.

The expression "multimodal" or "bimodal" used herein refers to the modality of the polymer, i.e. the form of its molecular weight distribution curve, which is the graph of the molecular weight fraction as a function of its molecular weight. As will be explained below, the polymer components of the present invention can be produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution curve of the final polymer, that curve may show two or more maxima or at least be distinctly broadened when compared with curves for the individual fractions. Such a polymer, produced in two or more serial steps, is called bimodal or multimodal, depending on the number of steps.

Further it is preferred that the propylene homopolymer (A) has a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined dye under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.).

As will be explained below in greater detail, the propylene homopolymer (A) can be prepared in a first step, i.e. before preparing the copolymer (B) and copolymer (B'), respectively, or at a later stage. If prepared in a later stage, the propylene homopolymer (A) can be reactor-blended with a component, i.e. the copolymer (B) or copolymer (B'), already prepared before, thereby resulting in a polymeric mixture from which only a total melt flow rate can be determined but not the melt flow rate of each component within the blend. However, even if obtained as a reactor blend, the $MFR_2$ (230° C.) of the propylene homopolymer (A) refers to a pure homopolymer fraction. In other words, it is the melt flow rate value of the propylene homopolymer (A) that would have been obtained if polymerized without the presence of further components. The same applies for propylene copolymer (B) or (B') further defined below by the $MFR_2$ (230° C.), i.e. the melt flow rate value of the propylene copolymer (B) or (B') given in the instant invention is understood as the MFR of the propylene copolymer (B) or (B') polymerized without the presence of further components.

Accordingly it is preferred that the propylene homopolymer (A) has a melt flow rate $MFR_2$ (230° C.) of not more than 5 g/10 min., preferably less than 5 g/10 min., more preferably less than 2 g/10 min., like less than 0.8 g/10 min.

The second mandatory component of the polypropylene composition is a propylene copolymer which is either a propylene-butene copolymer (B) or a propylene-ethylene copolymer (B').

The propylene-butene copolymer (B) may comprise further α-olefin(s), like C2 or C5 to C10 α-olefin(s). In such a case ethylene is in particular preferred. Thus in one preferred embodiment the propylene-butene copolymer (B) is a terpolymer comprising propylene, 1-butene and ethylene. However it is more preferred that the propylene-butene copolymer (B) does not comprise further comonomer(s), i.e. 1-butene is the only comonomer of the propylene-butene copolymer (B) (binary propylene-butene copolymer (B)).

The propylene-ethylene copolymer (B') may comprise further α-olefin(s), like C4 to C10 α-olefin(s). In such a case 1-butene is in particular preferred. Thus in one preferred embodiment the propylene-ethylene copolymer (B') is a terpolymer comprising propylene, ethylene and 1-butene. However it is more preferred that the propylene-ethylene copolymer (B') does not comprise further comonomer(s), i.e. ethylene is the only comonomer of the propylene-ethylene copolymer (B') (binary propylene-ethylene copolymer (B')).

Thus the binary propylene-butene copolymer (B) and the binary propylene-ethylene copolymer (B') are preferred, wherein the binary propylene-butene copolymer (B) is in particular preferred.

More preferably the above defined copolymers (B) and (B') are random copolymers. Thus a random propylene-butene copolymer (B) according to the present invention is random propylene-butene copolymer produced by statistical insertion of units of 1-butene (if present with units of ethylene or a C5 to C10 α-olefin, preferably ethylene, to give terpolymers). On the other hand a random propylene-ethylene copolymer (B') according to the present invention is random propylene-ethylene copolymer produced by statistical insertion of units of ethylene (if present with units of C4 to C10 α-olefin, preferably 1-butene, to give terpolymers).

The type of comonomer has a significant influence on a number of properties like crystallization behaviour, stiffness, melting point or flowability of the polymer melt. To solve the objects of the present invention, in particular to provide an improved balance between stiffness, impact resistance and pressure test performance it is necessary that the copolymer (B) or copolymer (B') comprises 1-butene (for (B)) and ethylene (for (B')), respectively, as a comonomer at least in a detectable manner.

On the other hand the copolymer (B) or (B') shall be preferably not an elastomer as for instance defined below.

Thus, to achieve especially good results the propylene-butene copolymer (B) comprises preferably not more than up to 8.0 wt.-% comonomer, in particular butene, based on the weight of the propylene-butene copolymer (B). As stated above the comonomer 1-butene is mandatory whereas other α-olefins can be additionally present. However the amount of additional α-olefins shall preferably not exceed the amount of 1-butene in the propylene-butene copolymer (B). More preferably the amount of comonomer, in particular 1-butene, within the propylene-butene copolymer (B) does not exceed 7.0 wt.-%, still more preferably does not exceed 6.0 wt.-% and yet more preferably does not exceed 5.0 wt.-%. Accordingly the amount of comonomer, in particular 1-butene, within the propylene-butene copolymer (B) is from 0.2 to 7.0 wt.-%, more preferably from 0.5 to 6.0 wt.-%, still more preferably from 0.5 to 5.0 wt.-%.

In case the copolymer is a propylene-ethylene copolymer (B') it is preferred that it comprises not more than up to 5.0 wt.-% comonomer, in particular ethylene, based on the weight of the propylene-ethylene copolymer (B'). As stated above the comonomer ethylene is mandatory whereas other α-olefins can be additionally present. However the amount of additional α-olefins shall preferably not exceed the amount of ethylene in the propylene-ethylene copolymer (B'). More preferably the amount of comonomer, in particular ethylene, within the propylene-ethylene copolymer (B') does not exceed 4.0 wt.-%, still more preferably does not exceed 3.5 wt.-% and yet more preferably does not exceed 3.0 wt.-%. Accordingly the amount of comonomer, in particular ethylene, within the propylene-ethylene copolymer (B') is from 0.2 to 5.0 wt.-%, more preferably from 0.5 to 3.5 wt.-%, still more preferably from 0.5 to 2.5 wt.-%.

Preferably, the copolymer (B) or the copolymer (B') has a weight average molecular weight which is equal or higher than the weight average molecular weight of the propylene homopolymer (A). Since molecular weight and melt flow rate are in a reciprocal relation to each other, it is also preferred that the copolymer (B) or the copolymer (B') has $MFR_2$ (230° C.) which is lower or same than the $MFR_2$ (230° C.) of the propylene homopolymer (A). In any case it is preferred that the propylene-butene copolymer (B) or the propylene-ethylene copolymer (B') has $MFR_2$ (230° C.) of not more than 5.0 g/10 min., more preferably of less than 1.5 g/10 min, still more preferred of less than 0.5 g/10 min measured according ISO 1133.

In a preferred embodiment, the propylene homopolymer (A) and the copolymer (B) or (B') are prepared in two or more reactors connected to each other in serial configuration, as will be explained below in greater detail. As a consequence, both components are reactor-blended during polymerization and result preferably in a multimodal, more preferably bimodal, polypropylene composition. Preferably the homopolymer (A) has a lower molecular weight than the copolymer (B) or (B').

Also the weight ratio of the propylene homopolymer (A) and the copolymer (B) or the weight ratio of the propylene homopolymer (A) and the copolymer (B') of the polypropylene composition contributes to the present invention. Thus it is preferred that the polypropylene composition comprises (a)
  (i) 30 to 70 wt.-%, more preferably 35 to 65 wt.-%, still more preferably 40 to 60 wt.-%, yet more preferably 45 to 55 wt.-% propylene homopolymer (A) based on homoplymer (A) and copolymer (B) (homopolymer (A)/(homopolymer (A)+compolymer (B))
  (ii) 30 to 70 wt.-%, more preferably 35 to 65 wt.-%, still more preferably 40 to 60 wt.-%, yet more preferably 45 to 55 wt.-% copolymer (B) based on homplymer (A) and copolymer (B) (homopolymer (A)/(homopolymer (A)+copolymer (B))

or
(b)
  (i) 30 to 70 wt.-%, more preferably 35 to 65 wt.-%, still more preferably 40 to 60 wt.-%, yet more preferably 45 to 55 wt.-% propylene homopolymer (A) based on homoplymer (A) and copolymer (B') (homopolymer (A)/(homopolymer (A)+copolymer (B'))
  (ii) 30 to 70 wt.-%, more preferably 35 to 65 wt.-%, still more preferably 40 to 60 wt.-%, yet more preferably 45 to 55 wt.-% copolymer (B') based on homplymer (A) and copolymer (B') (homopolymer (A)/(homopolymer (A)+copolymer (B')).

It is preferred that the both polymer components of the polypropylene composition are the main components, i.e. exceed more than 70 wt.-%, preferably more than 80 wt.-%, more preferably more than 90 wt.-%, yet more preferably more than 95 wt.-%.

Accordingly in one preferred embodiment the polypropylene composition does not comprise an elastomeric component, like an elastomeric copolymer of propylene and at least one olefin comonomer, i.e. an ethylene-propylene rubber (EPR) as disclosed for instance in Encyclopedia of Polymer Science and Engineering, second edition, vol. 6, p. 545-558. An elastomeric component according to the understanding of the present invention is in particular a propylene copolymer with one or more copolymerizable C2 or C4 to C10 α-olefin(s), particularly ethylene, in the amount of at least 25 wt.-% in the elasomeric component and more preferably up to 50 wt.-% in the elastomeric component.

In another preferred embodiment the polypropylene composition comprises an elastomeric component as defined in the previous paragraph.

More preferably the polypropylene composition of the instant invention comprises the propylene homopolymer (A) and the copolymer (B) or (B') as the only polymer components of said composition, i.e. the composition may comprise further additives and in particular β-nucleating agents but no further other polymer. Thus the both polymer components, i.e. the propylene homopolymer (A) and the copolymer (B) or (B'), represents together preferably more than 80 wt.-%, more preferably more than 90 wt.-%, still more preferably more than 95 wt.-%, yet more preferably more than 97 wt.-%, like equal or more than 98 wt.-% of the polypropylene composition, whereas the remaining part, i.e. preferably not more than 20 wt.-%, more preferably not more than 10 wt.-%, still more preferably not more than 5 wt.-%, yet more preferably not more than 3 wt.-%, like equal or less than 3 wt.-% of the polypropylene composition represents non-polymer components, like β-nucleating agents and optionally further additives, like fillers not interacting with the beta-nucleating agents, e.g. mica and/or chalk As a further requirement the polypropylene composition must be β-nucleated, i.e. the polypropylene composition must be partially crystallized in the β-modification. Thus it is preferred that the amount of β-modification of the polypropylene composition is at least 50%, more preferably at least 60%, still more preferably at least 65%, like at least 70% (determined by DSC using the second heat as described in detail in the example section).

It has been recognized that the β-nucleation takes in particular place in the high molecular weight propylene homopolymer (A). Thus as a further preferred requirement the propylene homopolymer (A) is more β-crystallised than the copolymer (B) or (B').

Of course the polypropylene composition comprises preferably also β-nucleating agents. The preferred β-nucleating agents are defined in more detail below where the process for the manufacture of the inventive polypropylene composition is described. The amount of β-nucleating agents is in the range of 0.0001 to 2.0 wt.-%, more preferably in the range of 0.005 to 0.5 wt.-%, based on the sum of polymers, in particular on the sum of the propylene homopolymer (A) and the copolymer (B) or (B').

Additionally it is preferred that the polypropylene composition itself has a rather low melt flow rate (MFR). Thus it is appreciated that the polypropylene composition has $MFR_2$ (230° C.) of not more than 0.8 g/10 min, more preferably not more than 0.3 g/10 min. Preferred ranges are 0.2 to 0.8 g/10 min, like 0.2 to 0.3 g/10 min.

As stated above it is appreciated that the polypropylene composition shows a multimodal, preferably bimodal, molecular weight distribution curve. Thus it is preferred that the polypropylene composition has a molecular weight distribution (MWD) of 3 to 8, more preferably in the range of 4 to 6.

The number average molecular weight (Mn) and the weight average molecular weight (Mw) as well as the molecular weight distribution (MWD) are determined in the instant invention by size exclusion chromatography (SEC) using Waters Alliance GPCV 2000 instrument with online viscometer. The oven temperature is 140° C. Trichlorobenzene is used as a solvent (ISO 16014). The exact measuring method is determined in the example section.

The molecular weight distribution can be also expressed in shear thinning and polydispersity measured by dynamic rheometer as defined in the example section. Thus the shear thinning index (SHI (0/50)) of the polypropylene composition is preferably greater than 9 and/or the polydispersity index (PI) is greater than 3.5.

Furthermore it is appreciated that the comonomer content of the total polypropylene composition is not too high.

Thus it is preferred that the amount of comonomers, in particular 1-butene, present in the polypropylene composition, which comprises the propylene-butene copolymer (B), is not more than up to 6.0 wt.-%, more preferably is not more than up to 5.0 wt.-%, still more preferably is not more than up to 4.0 wt.-% based on the total weight of the polypropylene composition. Accordingly the amount of comonomer, in particular 1-butene, of the total polypropylene composition is from 0.1 to 6.0 wt.-%, more preferably from 0.2 to 5.0 wt.-%, still more preferably from 0.5 to 5.0 wt.-%.

As stated above the comonomer 1-butene in the polypropylene composition is mandatory whereas other α-olefins can be additionally present. However the amount of additional α-olefins shall preferably not exceed the amount of 1-butene in the polypropylene composition. More preferably the amount of comonomers as given in the previous paragraph relates to 1-butene only, whereas other comonomers are not present in the inventive polypropylene composition.

On the other hand it is appreciated in case the polypropylene composition comprises the propylene-ethylene copolymer (B') that the comonomer content of the total polypropylene composition, i.e. the amount of ethylene and optionally another α-olefin, i.e. C4 to C10 α-olefin, is not more than up to 5.0 wt.-%, more preferably is not more than up to 3.0 wt.-%, still more preferably is not more than up to 2.5 wt.-% based on the total weight of the polypropylene composition. Accordingly the amount of comonomer, in particular ethylene, of the total polypropylene composition is from 0.1 to 5.0 wt.-%, more preferably from 0.2 to 4.0 wt.-%, still more preferably from 0.5 to 2.0 wt.-%.

As stated above the comonomer ethylene in the polypropylene composition is mandatory whereas other α-olefins can be additionally present. However the amount of additional α-olefins shall preferably not exceed the amount of ethylene in the polypropylene composition. More preferably the amount of comonomers as given in the previous paragraph relates to ethylene only, whereas other comonomers are not present in the inventive polypropylene composition.

Moreover it is preferred that the amount of xylene solubles of polypropylene composition is not too high. Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas. Accordingly it is preferred that the xylene solubles of the inventive polypropylene composition is less than 5.0 wt.-%, more preferably less than 4 wt.-%. In preferred embodiments the xylene solubles are in the range of 0.6 to 5.0 wt.-% and more preferably in the range of 1.0 to 4.0 wt.-%.

Additionally it is appreciated that the polypropylene composition enables to provide pipes with a rather high resistance to deformation, i.e. have a high stiffness. Accordingly it is preferred that the polypropylene composition in an compression molded state and/or the pipes based on said polypropylene composition has/have a flexural modulus measured according to ISO 178 of at least 1300 MPa, more preferably of at least 1500 MPa, yet more preferably of at least 1600 Mpa. In case the measurement is performed with a polypropylene composition in an injection molded state and/or the pipes based on said polypropylene composition has/have a flexural modulus measured according to ISO 178 of at least 1100 MPa, more preferably of at least 1300 MPa.

Furthermore it is appreciated that the polypropylene composition enables to provide pipes having an rather high impact strength. Accordingly it is preferred that the polypropylene composition in an compression molded state and/or the pipes based on said polypropylene composition has/have an impact strength measured according the Charpy impact test (ISO 179 (1 eA)) at 23° C. of at least 9.0 kJ/m$^2$, more preferably of at least 9.5 kJ/m$^2$, yet more preferably of at least 10.0 kJ/m$^2$ and/or an high impact strength measured according the Charpy impact test (ISO 179 (1 eA)) at −20° C. of at least 2.5 kJ/m$^2$, more preferably of at least 3.0 kJ/m$^2$, yet more preferably of at least 3.5 kJ/m$^2$. In case the measurement is performed with a polypropylene composition in an injection molded state has an impact strength measured according the Charpy impact test (ISO 179 (1 eA)) at 23° C. of at least 30.0 kJ/m$^2$, more preferably of at least 35.0 kJ/m$^2$, yet more preferably of at least 40.0 kJ/m$^2$ and/or an high impact strength measured according the Charpy impact test (ISO 179 (1 eA)) at −20° C. of at least 2.5 kJ/m$^2$, more preferably of at least 3.0 kJ/m$^2$, yet more preferably of at least 3.5 kJ/m$^2$.

The instant polypropylene composition has been in particular developed to improve the properties of pipes and cables, in particular in terms of very good creep performance by keeping the other properties, like resistance to deformation and impact strength, on a high level. Thus the instant invention is also directed to the use of the instant polypropylene composition as part of a pipe, like a pressure pipe, and for the manufacture of pipes. Moreover the instant invention is directed to the use of the instant polypropylene composition as part cable, like a multi conductor cable, and for the manufacture of cables.

In addition it is appreciated that polypropylene composition enables to provide pipes and cables having a very good creep performance. Thus it is preferred that the polypropylene composition and/or the pipes and cables, respectively, based on the polypropylene composition has/have a pressure test performance measured according ISO 1167 (16 MPa and 20° C., pipe diameter 32 mm; wall thickness 3 mm) of at least 600 h, more preferably of at least 1400 h.

Furthermore, the present invention is also directed to cables, like multi conductor cables, pipes and/or pipe fittings, in particular pressure pipes, based on the polypropylene composition as defined in the instant invention. These cables, pipes, in particular pressure pipes, are in particular characterized by the flexural modulus, impact strength and creep performance as defined in the three previous paragraphs.

The term "pipe" as used herein is meant to encompass hollow articles having a length greater than diameter. Moreover the term "pipe" shall also encompass supplementary parts like fittings, valves and all parts which are commonly necessary for e.g. a hot water piping system.

Pipes according to the invention also encompass single and multilayer pipes, where for example one or more of the layers is a metal layer and which may include an adhesive layer.

The polypropylene compositions used for pipes and cables according to the invention may contain usual auxiliary materials, e.g. up to 10 wt.-% fillers and/or 0.01 to 2.5 wt.-% stabilizers and/or 0.01 to 1 wt.-% processing aids and/or 0.1 to 1 wt.-% antistatic agents and/or 0.2 to 3 wt.-% pigments and/or reinforcing agents, e.g. glass fibres, in each case based on the propylene composition used. In this respect, it has to be noted, however, that any of such of auxiliary materials which serve as highly active α-nucleating agents, such as certain pigments, are not utilized in accordance with the present invention.

According to the present invention, there is also provided a process for preparing the polypropylene composition discussed above. Accordingly the polypropylene composition is produced in a multistage process and subsequently β-nucleated. In a particular preferred embodiment the propylene homopolymer (A) is produced in a loop reactor and subsequently the (B) or (B') is produced in the gas phase reactor. In the following a preferred process is described in more detail: Such a process for the manufacture of the present invention comprises the following steps:
 (i) preparing a propylene homopolymer (A),
 (ii) copolymerization of propylene with butene and optionally with ethylene or a C5 to C10 α-olefin to result in a (random) propylene-butene copolymer (B), or propylene with ethylene and optionally with a C4 to C10 α-olefin to result in a (random) propylene-ethylene copolymer (B'), and (iii) mixing, in particular melt mixing, the obtained composition with β-nucleating agents, in particular with 0.0001 to 2.0 wt.-% based on said composition of β-nucleating agents, at temperatures in the range of 175 to 300° C.

(iv) cooling and crystallizing the β-nucleated polypropylene composition.

The sequence (i) and (ii) can be reversed run, i.e. the copolymer (B) or (B') can be produced first and subsequently the propylene homopolymer (A). However, it is preferred to have the sequence (i) (ii) (iii) as stated above.

Preferably, the process steps (i) and (ii) are carried out in at least one loop reactor and/or at least one gas phase reactor.

According to a preferred embodiment, the first reaction step is carried out in a loop reactor, this step optionally also comprises at least one gas phase reactor to which the product of the loop reactor is transferred to continue polymerization. Preferably, any reaction medium used and any non-reacted reagents are by direct feed transferred from the loop reactor to the gas phase reactor, but also flash can be used between the two reactors.

For the present invention, conventional loop and gas phase reactors which are commonly known in the relevant technical field can be used.

If the propylene homopolymer (A) is prepared first, reaction conditions are chosen so as to preferably have a $MFR_2$ (230° C.) of less than 5 g/10 min for the propylene homopolymer (A). By using a loop reactor and at least one gas phase reactor in serial configuration and working at different conditions, a multimodal (e.g. bimodal) propylene homopolymer (A) can be obtained. However, within the context of the present invention, the propylene homopolymer (A) can also be unimodal.

As an alternative, the (random) copolymer (B) or (B') is prepared first. Again, polymerization can be effected by using a loop reactor only or a loop reactor in serial configuration with at least one gas phase reactor, the latter configuration resulting in a multimodal (e.g. bimodal) polypropylene random copolymer.

The amount and feed rate of olefin comonomer fed into the reactor for copolymerization with propylene are preferably such that the (random) copolymer (B) or (B') has an amount of α-olefin comonomers, preferably 1-butene (in case of copolymer (B)) or ethylene (in case of copolymer (B')), units of 0.2 to 8.0 wt %, based on the weight of the (random) copolymer (B) or (B'). Preferably, 1-butene (in case of copolymer (B)) or ethylene (in case of copolymer (B')) is used as the only α-olefin comonomer.

In a preferred embodiment, the propylene homopolymer (A) is prepared first in a loop reactor. Preferably, the propylene homopolymer (A) has preferably a $MFR_2$ (230° C.) of less than 5 g/10 min, more preferably less than 2 g/10 min. and even more preferably less than 0.8 g/10 min. Subsequently, the propylene homopolymer (A) is transferred to a first gas phase reactor wherein (a) copolymerization of propylene with butene and optionally with ethylene or an C5 to C10 α-olefin, preferably only butene, to the (random) propylene-butene copolymer (B) is effected, thereby resulting in a reactor-blended polymeric mixture having preferably an amount of comonomer units, preferably butene units, of 0.1 to 6.0 wt.-%, preferably of 0.1 to 5.0 wt.-%, more preferably of 0.5 to 4.5 wt.-%, based on the weight of the polypropylene composition.

or (b) copolymerization of propylene with ethylene and optionally with a C4 to C10 α-olefin, preferably only ethylene, to the (random) propylene-ethylene copolymer (B;) is effected, thereby resulting in a reactor-blended polymeric mixture having preferably an amount of comonomer units, preferably ethylene units, of 0.1 to 5.0 wt.-%, preferably of 0.1 to 5.0 wt.-%, more preferably of 0.5 to 3.5 wt.-%, based on the weight of the polypropylene composition.

Preferably, a loop reactor for preparing a propylene homopolymer (A) or (random) copolymer (B) and (B'), respectively, is operated at a temperature of 60 to 95° C. and a pressure of 4000 to 8000 kPa.

Preferably, a gas phase reactor for preparing a propylene homopolymer (A) or (random) (B) and (B'), respectively, is operated at a temperature of 60 to 100° C. and a pressure of 1000 to 4000 kPa.

To further improve the balance of the desired properties of the polypropylene composition a specific split between a first process step producing a first component and a second process step producing a second component can be chosen. The split indicates the weight ratio between different polymeric components prepared in different reaction steps. Preferably, the split between process step (i) and process step (ii), irrespective of their sequence, is from 70:30 to 30:70, more preferably from 65:35 to 35:65 and even more preferably from 60:40 to 40:60.

As a catalyst for the preparation of the propylene homopolymer (A) and/or the (random) (B) and (B'), respectively, any stereo-specific catalyst for propylene polymerization can be used, which is capable of catalyzing polymerization and copolymerization of propylene and comonomers, in particular butene, at a pressure of 500 to 10000 kPa, in particular 2500 to 8000 kPa, and at a temperature of 40 to 110° C., in particular 60 to 110° C.

Preferably, the catalyst comprises a high-yield Ziegler-Natta type catalyst which can be used at high polymerization temperatures of 80° C. or more.

Generally, the Ziegler-Natta catalyst used in the present invention comprises a catalyst component, a cocatalyst component, an external donor, the catalyst component of the catalyst system primarily containing magnesium, titanium, halogen and an internal donor. Electron donors control the stereospecific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds, titanium trichloride and titanium tetrachloride being particularly preferred.

It is preferred to use catalysts which can withstand the high temperatures prevailing in the loop reactor. The conventional Ziegler-Natta catalysts for isotactic polymerization of propylene generally have an operating temperature limit of around 80° C., above which they either become deactivated or lose their stereo-selectivity. This low polymerization temperature may put a practical limit on the heat removal efficiency of the loop reactor.

One preferred catalyst to be used according to the invention is disclosed in EP 591 224 which discloses a method for preparing a procatalyst composition from magnesium dichloride, a titanium compound, a lower alcohol and an ester of phthalic acid containing at least five carbon atoms. According to EP 591 224, a trans-esterification reaction is carried out at an elevated temperature between the lower alcohol and the phthalic acid ester, whereby the ester groups from the lower alcohol and the phthalic ester change places.

Magnesium dichloride can be used as such or it can be combined with silica, e.g. by absorbing the silica with a solution or slurry containing magnesium dichloride. The lower alcohol used may preferably be methanol or ethanol, particularly ethanol.

The titanium compound used in the preparation of the procatalyst is preferably an organic or inorganic titanium compound, which is at the oxidation state of 3 or 4. Also other transition metal compounds, such as vanadium, zirconium, chromium, molybdenum and tungsten compounds can be mixed with the titanium compound. The titanium compound usually is a halide or oxyhalide, an organic metal halide, or a purely metal organic compound in which only organic ligands have been attached to the transition metal. Particularly preferred are the titanium halides, especially titanium tetrachloride.

The alkoxy group of the phthalic acid ester used comprises at least five carbon atoms, preferably at least eight carbon atoms. Thus, as the ester may be used e.g. propylhexyl phthalate, dioctyl phthalate, di-isodecyl phthalate and ditridecyl phthalate. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the procatalyst composition, transesterifies the catalyst at an elevated temperature. It is preferred to carry out the transesterification at a temperature which is 110 to 115° C., preferably 120 to 140° C.

The catalyst is used together with an organometallic cocatalyst and with an external donor. Generally, the external donor has the formula

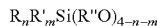

$R_n R'_m Si(R''O)_{4-n-m}$ wherein
R and R' can be the same or different and represent a linear, branched or cyclic aliphatic, or aromatic group;
R" is methyl or ethyl;
n is an integer of 0 to 3;
m is an integer of 0 to 3; and
n+m is 1 to 3.

In particular, the external donor is selected from the group consisting of cyclohexyl methylmethoxy silane (CHMMS), dicyclopentyl dimethoxy silane (DCPDMS), diisopropyl dimethoxy silane, di-isobutyl dimethoxy silane, and di-t-butyl dimethoxy silane.

An organoaluminium compound is used as a cocatalyst. The organoaluminium compound is preferably selected from the group consisting of trialkyl aluminium, dialkyl aluminium chloride and alkyl aluminium sesquichloride.

According to the invention, such catalysts are typically introduced into the first reactor only. The components of the catalyst can be fed into the reactor separately or simultaneously or the components of the catalyst system can be precontacted prior to the reactor.

Such precontacting can also include a catalyst prepolymerization prior to feeding into the polymerization reactor proper. In the prepolymerization, the catalyst components are contacted for a short period with a monomer before feeding to the reactor.

As described above, after the manufacture of the polypropylene composition a β-nucleation step follows. As β-nucleating agent any nucleating agent can be used which is suitable for inducing crystallization of polypropylene homo- and copolymers in the hexagonal or pseudohexagonal modification. Mixtures of such nucleating agents may also be employed.

Suitable types of β-nucleating agents are
dicarboxylic acid derivative type diamide compounds from $C_5$ to $C_8$-cycloalkyl monoamines or $C_6$ to $C_{12}$-aromatic monoamines and $C_5$ to $C_8$-aliphatic, $C_5$ to $C_8$-cycloaliphatic or $C_6$ to $C_{12}$-aromatic dicarboxylic acids, e.g.
N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide,
N,N-di-$C_5$-$C_8$-cycloalkyl-4,4-biphenyldicarboxamide compounds such as N,N'-dicyclohexyl-4,4-biphenyldicarboxamide and N,N'-dicyclopentyl-4,4-biphenyldicarboxamide,
N,N'-di-$C_5$-$C_8$-cycloalkyl-terephthalamide compounds such as N,N'-dicyclohexylterephthalamide and N,N'-dicyclopentylterephthalamide,
N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide,
diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, e.g.
N,N—$C_6$-$C_{12}$-arylene-bis-benzamide compounds such as N,N'-p-phenylene-bis-benzamide and N,N'-1,5-naphthalene-bis-benzamide,
N,N'—$C_5$-$C_8$-cycloalkyl-bis-benzamide compounds such as N,N'-1,4-cyclopentane-bis-benzamide and N,N'-1,4-cyclohexane-bis-benzamide,
N,N-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and
N,N'—$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide,
amino acid derivative type diamide compounds from amidation reaction of $C_5$-$C_8$-alkyl, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, e.g.
N-phenyl-5-(N-benzoylamino)pentaneamide and N-cyclohexyl-4-(N-cyclohexyl-carbonylamino)benzamide.

Further suitable of β-nucleating agents are
quinacridone type compounds, e.g. quinacridone, dimethylquinacridone and dimethoxyquinacridone,
quinacridonequinone type compounds, e.g. quinacridonequinone, a mixed crystal of 5,12-dihydro(2,3b)acridine-7,14-dione with quino(2,3b)acridine-6,7,13,14-(5H,12H)-tetrone and dimethoxyquinacridonequinone and dihydroquinacridone type compounds, e.g. dihydroquinacridone, dimethoxydihydroquinacridone and dibenzodihydroquinacridone.

Still further suitable β-nucleating agents are dicarboxylic acid salts of metals from group IIa of periodic system, e.g. pimelic acid calcium salt and suberic acid calcium salt; and mixtures of dicarboxylic acids and salts of metals from group IIa of periodic system.

Still further suitable β-nucleating agents are salts of metals from group IIa of periodic system and imido acids of the formula

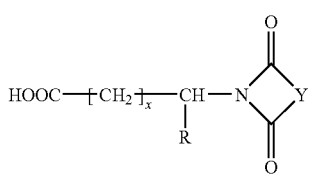

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, e.g. calcium salts of phthaloylglycine, hexahydrophthaloylglycine, N-phthaloylalanine and/or N-4-methylphthaloylglycine.

Preferred β-nucleating agents are any one or mixtures of N,N'-dicyclohexyl-2,6-naphthalene dicarboxamide, quinacridone type or pimelic acid calcium-salt (EP 0 682 066).

In case pipes shall be produced of the inventive polypropylene composition than after the manufacture of the inventive polypropylene composition the following steps follow. In general the inventive polypropylene composition is extruded and subsequently formed into a pipe or surrounds a conductor or several conductors.

Accordingly the inventive pipe is preferably produced by first plasticizing the polypropylene composition of the instant invention in an extruder at temperatures in the range of from 200 to 300° C. and then extruding it through an annular die and cooling it.

The extruders for producing the pipe can be single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Ring shaped dies with diameters ranging from approximately 16 to 2000 mm and even greater are possible.

The melt arriving from the extruder is first distributed over an annular cross-section via conically arranged holes and then fed to the core/die combination via a coil distributor or screen. If necessary, restrictor rings or other structural elements for ensuring uniform melt flow may additionally be installed before the die outlet. After leaving the annular die, the pipe is taken off over a calibrating mandrel, usually accompanied by cooling of the pipe by air cooling and/or water cooling, optionally also with inner water cooling.

Considering the information provided above the present invention is in particular directed to the following embodiments:

Paragraph 1: Polypropylene composition comprising
(a) a propylene homopolymer (A) and
(b) a propylene-butene copolymer (B) or a propylene-ethylene copolymer (B'),
wherein the polypropylene composition is β-nucleated.

Paragraph 2: Polypropylene composition according to paragraph 1, wherein the propylene homopolymer (A) is an isotactic propylene homopolymer.

Paragraph 3: Polypropylene composition according to paragraph 1 or 2, wherein the propylene homopolymer (A) has $MFR_2$ (230° C.) of not more than 5.0 g/10 min measured according ISO 1133.

Paragraph 4: Polypropylene composition according to any one of the preceding paragraphs 1 to 3, wherein the copolymer (B) or the copolymer (B') is a random copolymer.

Paragraph 5: Polypropylene composition according to any one of the preceding paragraphs 1 to 4, wherein the propylene-butene copolymer (B) comprises up to 8 wt.-% 1-butene.

Paragraph 6: Polypropylene composition according to any one of the preceding paragraphs 1 to 4, wherein the propylene-ethylene copolymer (B') comprises up to 5 wt.-% ethylene.

Paragraph 7: Polypropylene composition according to any one of the preceding paragraphs 1 to 6, wherein the copolymer (B) or copolymer (B') has $MFR_2$ (230° C.) of not more than 5.0 g/10 min measured according ISO 1133.

Paragraph 8: Polypropylene composition according to any one of the preceding paragraphs 1 to 7, wherein the polypropylene composition comprises
(a)
(i) 30 to 70 wt.-% propylene homopolymer (A) based on homopolymer (A) and copolymer (B) (homopolymer (A)/(homopolymer (A)+copolymer (B)) and
(ii) 70 to 30 wt.-% propylene-butene copolymer (B) based on homopolymer (A) and copolymer (B) (homopolymer (A)/(homopolymer (A)+copolymer (B))
or
(b)
(i) 30 to 70 wt.-% propylene homopolymer (A) based on homopolymer (A) and copolymer (B') (homopolymer (A)/(homopolymer (A)+copolymer (B')) and
(ii) 70 to 30 wt.-% propylene-butene copolymer (B) based on homopolymer (A) and copolymer (B) (homopolymer (A)/(homopolymer (A)+copolymer (B)).

Paragraph 9: Polypropylene composition according to any one of the preceding paragraphs 1 to 8, wherein the polypropylene composition is partially crystallized in the β-modification.

Paragraph 10: Polypropylene composition according to any one of the preceding paragraphs 1 to 9, wherein the amount of β-modification of the polypropylene composition is at least 50%.

Paragraph 11: Polypropylene composition according to any one of the preceding paragraphs 1 to 10, wherein the polypropylene composition comprises up to 5.0 wt.-% comonomer, preferably up to 5.0 wt.-% 1-butene or ethylene.

Paragraph 12: Polypropylene composition according to any one of the preceding paragraphs 1 to 11, wherein the polypropylene composition has a xylene soluble fraction of less than 5 wt.-%.

Paragraph 13: Polypropylene composition according to any one of the preceding paragraphs 1 to 12, wherein the polypropylene composition has $MFR_2$ (230° C.) of not more than 0.8 g/10 min measured according ISO 1133.

Paragraph 14: Polypropylene composition according to any one of the preceding paragraphs 1 to 13, wherein the polypropylene composition has been produced in a multi-stage process.

Paragraph 15: Polypropylene composition according to paragraph 14, wherein the propylene homopolymer (A) is produced in a loop reactor and subsequently the copolymer (B) or the copolymer (B') is produced in a gas phase reactor.

Paragraph 16: Polypropylene composition according to any one of the preceding paragraphs 1 to 15, wherein the polypropylene composition in a compression molded state has a flexural modulus measured according to ISO 178 of at least 1300 Mpa.

Paragraph 17: Polypropylene composition according to any one of the preceding paragraphs 1 to 16, wherein the polypropylene composition in a compression molded state has an impact strength measured according the Charpy impact test (ISO 179 (1 eA)) at 23° C. of at least 9.5 kJ/m² and/or an impact strength measured according the Charpy impact test (ISO 179 (1 eA)) at −20° C. of at least 2.5 kJ/m².

Paragraph 18: Process for the manufacture of the polypropylene composition according to any one of the preceding paragraphs 1 to 17 wherein the polypropylene composition is produced in a multistage process and subsequently treated with a β-nucleating agent.

Paragraph 19: Process according to paragraph 18, wherein the propylene homopolymer (A) is produced in a loop reactor and subsequently the copolymer (B) or the copolymer (B') is produced in a gas phase reactor.

Paragraph 20: Use of a polypropylene composition according to any one of the preceding paragraphs 1 to 17 for the manufacture of pipes or cables.

Paragraph 21: Use of a polypropylene composition according to any one of the preceding paragraphs 1 to 17 as part of a pipe or a cable.

Paragraph 22: Pipe or cable comprising a polypropylene composition according to any one of the preceding paragraphs 1 to 17.

Paragraph 23: Pipe according to paragraph 22, wherein the pipe is a pressure pipe.

Paragraph 24: Process for the manufacture of a pipe or cable according to paragraph 22 or 23, wherein a melt of the polypropylene composition according to any of the preceding paragraphs 1 to 17 is extruded and subsequently formed to a pipe or surrounds a conductor(s).

The present invention will now be described in further detail by the examples provided below.

EXAMPLES

1. Definitions/Measuring Methods

The following definitions of terms and determination methods apply for the above general description of the invention as well as to the below examples unless otherwise defined.

Number average molecular weight ($M_n$), weight average molecular weight ($M_w$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Rheology: Dynamic rheological measurements were carried out with Rheometrics RDA-II QC on compression molded samples under nitrogen atmosphere at 200° C. using 25 mm—diameter plate and plate geometry. The oscillatory shear experiments were done within the linear viscoelastic range of strain at frequencies from 0.01 to 500 rad/s. (ISO6721-1)

The values of storage modulus (G'), loss modulus (G"), complex modulus (G*) and complex viscosity (η*) were obtained as a function of frequency (ω).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

From the following equations $$\eta'=G''/\omega \text{ and } \eta''=G'/\omega$$

$$f'(\omega)=G''(\omega)*\omega/[G'(\omega)^2+G''(\omega)^2]$$

$$f''(\omega)=G'(\omega)*\omega/[G'(\omega)^2+G''(\omega)^2]$$

The polydispersity index, PI, is calculated from cross-over point of G'(ω) and G"(ω).

There is a linear correlation between f' and f" with zero ordinate value of $1/\eta_0$ (Heino et al.[1])

For polypropylene this is valid at low frequencies and five first points (5 points/decade) are used in calculation of $\eta_0$.

Shear thinning indexes (SHI), which are correlating with MWD and are independent of MW, were calculated according to Heino[1,2] (below).

SHI is calculated by dividing the Zero Shear Viscosity by a complex viscosity value, obtained at a certain constant shear stress value, G*. The abbreviation, SHI (0/50), is the ratio between the zero shear viscosity and the viscosity at the shear stress of 50 000 Pa.

1) Rheological characterization of polyethylene fractions. Heino, E. L.; Lehtinen, A; Tanner, J.; Seppälä, J. Neste Oy, Porvoo, Finland. Theor. Appl. Rheol., Proc. Int. Congr. Rheol., 11th (1992), 1 360-362

2) The influence of molecular structure on some rheological properties of polyethylene. Heino, Eeva-Leena. Borealis Polymers Oy, Porvoo, Finland. Annual Transactions of the Nordic Rheology Society, 1995

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994).

The NMR-measurement was used for determining the mmmm pentad concentration in a manner well known in the art.

$MFR_2$ is measured according to ISO 1133 (230° C., 2.16 kg load).

Comonomer content of C2 and C4 is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —CH$_2$— absorption peak (800-650 cm$^{-1}$) was measured with Perkin Elmer FTIR 1600 spectrometer. The method was calibrated by ethylene content data measured by $^{13}$C-NMR.

Content of β-modification: The β-crystallinity is determined by Differential Scanning Calorimetry (DSC). DSC is run according to ISO 3146/part 3/method C2 with a scan rate of 10° C./min. The amount of β-modification is calculated from the second heat by the following formula:

β-area/(α-area+β-area)

Since the thermodynamical β-modification starts to be changed into the more stable α-modification at temperatures above 150° C., a part of the β-modification is transferred within the heating process of DSC-measurement. Therefore, the amount of β-pp determined by DSC is lower as when measured according to the method of Turner-Jones by WAXS (A. Turner-Jones et. al., Makromol. Chem 75 (1964) 134).

"Second heat" means that the sample is heated according to ISO 3146/part 3/method C2 for a first time and then cooled to room temperature at a rate of 10° C./min. The sample is then heated a second time, also according to ISO 3146/part 3/method C2. This second heat is relevant for measurement and calculation.

During the "first heat" all thermal history of the sample giving rise to different crystalline structure, which typically comes from different processing conditions and/or methods, is destroyed. Using the second heat for determination of β-crystallinity, it is possible to compare samples regardless of the way the samples were originally manufactured.

The xylene solubles (XS, wt.-%): Analysis according to the known method (ISO 6427): 2.0 g of polymer is dissolved in 250 ml p-xylene at 135° C. under agitation. After 30±2 minutes the solution is allowed to cool for 15 minutes at ambient temperature (21° C.) and then allowed to settle for 30 minutes at 25±0.5° C. The solution is filtered and evaporated in nitrogen flow and the residue dried under vacuum at 90° C. until constant weight is reached.

$XS\% = (100 \times m_1 \times v_0)/(m_0 \times v_1)$, wherein $m_0$ = initial polymer amount (g)
$m_1$ = weight of residue (g)
$v_0$ = initial volume (ml)
$V_1$ = volume of analyzed sample (ml)

Intrinsic viscosity is measured according to DIN ISO 1628/1, October 1999 (in Decalin at 135° C.).

Flexural modulus is measured according to ISO 178.

The flexural modulus is measured on samples prepared from injection molded specimens as described in EN ISO 1873-2 (80×10×4 mm) or on compression molded specimens as described as follows: The polypropylen resin of the instant invention was compression molded at 220° C. in a cavity having the dimensions 240×240×4 mm according to the following procedure:

amount of resin is calculated using the cavity volume+ additional 10% of the cavity volume.
melt time from room temperature to 220° C.: 10 min
pressure was used in three steps (25/50/75 bar); 1 minute to reach 75 bar
press time at 220° C./75 bar: 5 min
cool down velocity 15° C./min
samples having the dimensions 80×10×4 mm were cut from the compression molded specimen.

The samples were tested after 96 h.

Charpy impact test: The charpy notched impact strength (Charpy NIS) is measured according to ISO 179 1 eA at 23° C. and −20° C., respectively. For the preparation of the injection molded test specimens and the compression molded test specimens see "flexural modulus".

Pressure test performance is measured according to ISO 1167. In this test, a specimen is exposed to constant circumferential (hoop) stress of 16 MPa at elevated temperature of 20° C. in water-in-water or 4.5 MPa at a temperature of 95° C. in water-in-water. The time in hours to failure is recorded. The tests were performed on pipes produced on a conventional pipe extrusion equipment, the pipes having a diameter of 32 mm and a wall thickness of 3 mm.

Determination of resistance of the pipe (H 50) is measured according to EN 1411 (January 1996) with a striker d25 having a weight of 0.5 kg.

EXAMPLES

The manufacture of the propylene compositions can be deducted from tables 1 to 4. The polymers were produced at Borstar PP pilot plant with a pre-polymerization (at 30° C.) and a loop and 2 gas phase reactors. The used catalyst, POLYTRAK® 8502 is a MgCl$_2$ supported transesterified (dioctyl phthalate/ethanol) high yield catalyst having essential components, Mg, Ti, Cl. (Ti=1.9 w %) The cocatalyst=TEA=triethyl aluminium.

TABLE 1

Process data (comparative examples)

| | Product name | | | |
|---|---|---|---|---|
| | CE 1 | CE 2 | CE 3 | CE 4 (RA7050) |
| Catalyst type | POLYTRAK® 8502 | POLYTRAK® 8502 | POLYTRAK® 8502 | |
| Donor type | DCPDMS | DCPDMS | DCPDMS | |
| TEA/Ti ratio [mol/mol] | 200 | 200 | 200 | |
| TEA/donor ratio [mol/mol] | 10 | 10 | 10 | |
| Loop Reactor | | | | |
| Temperature [° C.] | 85 | 85 | 85 | |
| Pressure [kPa] | 5500 | 5500 | 5500 | |
| H2/C3 ratio [mol/kmol] | 0.12 | 0.13 | 0.09 | |
| C4/C3 ratio [mol/kmol] | 150 | 145 | — | |
| Split % | 100 | 53 | 66 | |
| MFR$_2$ [g/10 min] | 0.22 | 0.29 | 0.26 | |

TABLE 1-continued

Process data (comparative examples)

| | CE 1 | CE 2 | CE 3 | CE 4 (RA7050) |
|---|---|---|---|---|
| XS [wt.-%] | 2.6 | 3.1 | 1.8 | |
| C4 content [wt.-%] | 4.3 | 4.3 | 0.0 | |
| Gas Phase Reactor 1 | | | | |
| Temperature [° C.] | | 85 | 85 | |
| Pressure [kPa] | — | 3300 | 3300 | |
| H2/C3 ratio [mol/kmol] | | 0.98 | 0.90 | |
| C4/C3 ratio [mol/kmol] | | 80 | 90 | |
| Split % | | 47 | 34 | |
| Gas Phase Reactor 2 | | | | |
| Temperature [° C.] | | | 70 | |
| Pressure [kPa] | | | 1800 | |
| C2/C3 ratio [mol/kmol] | | | 500 | |
| H2/C2 ratio [mol/kmol] | | | 24 | |
| Split % | | | 14 | |

TABLE 2

Product data (comparative examples)

| Final powder | CE 1 | CE 2 | CE 3 | CE 4 (RA7050) |
|---|---|---|---|---|
| $MFR_2$ [g/10 min] | 0.23 | 0.29 | 0.21 | |
| XS [wt.-%] | 2.2 | 1.8 | 14.6 | |
| AM [%] | | | 14.2 | |
| ethene of AM [%] | | | 29 | |
| viscosity of AM [dl/g] | | | 3.5 | |
| C2 content [%] | | | 3.9 | 3.5 |
| C4 content [%] | 4.3 | 3.7 | 1.8 | |
| Pellet $MFR_2$ [g/10 min] | 0.27 | 0.27 | 0.27 | 0.3 |

All the polymers were compounded at 270-300° C. with a twin screw extruder. All polymers were formulated: Irganox 168=1000 ppm; Irganox 1010=2000 ppm; Irganox 1330=5000 ppm; calcium stearate=700 ppm and 2 wt.-% master batch based on pigmented random polypropylene copolymer with 0.25 wt.-% Cinquasia Gold (from Ciba)=quinacridone type β-nucleating agent Reference grade RA7050 is a commercial random polypropylene copolymer grade (C2=3.5 wt.-% and MFR=0.3) from Borealis. It is β-nucleated with the same β-nucleator as the pilot materials.

TABLE 3

Process data (inventive examples)

| Product name | IE 1 | IE 2 | IE 3 |
|---|---|---|---|
| Catalyst type | POLYTRAK ® 8502 | POLYTRAK ® 8502 | POLYTRAK ® 8502 |
| Donor type | DCPDMS | DCPDMS | DCPDMS |
| TEA/Ti ratio [mol/mol] | 200 | 200 | 200 |
| TEA/donor ratio [mol/mol] | 10 | 10 | 10 |
| Loop Reactor | | | |
| Temperature [° C.] | 85 | 85 | 85 |
| Pressure [kPa] | 5500 | 5500 | 5500 |
| H2/C3 ratio [mol/kmol] | 0.11 | 0.21 | 0.21 |
| C4/C3 ratio [mol/kmol] | — | — | — |
| Split % | 53 | 42 | 47 |
| $MFR_2$ [g/10 min] | 0.19 | 0.23 | 0.17 |
| XS [wt.-%] | 2.0 | 2.5 | 2.5 |
| C4 content [wt.-%] | 0.0 | 0.0 | 0.0 |
| Gas Phase Reactor 1 | | | |
| Temperature [° C.] | 85 | 85 | 85 |
| Pressure [kPa] | 3300 | 3300 | 3300 |
| H2/C3 ratio [mol/kmol] | 0.71 | 0.71 | 0.71 |
| C2/C3 ratio [mol/kmol | | 14 | |
| C4/C3 ratio [mol/kmol] | 80 | | 85 |
| Split % | 47 | 58 | 53 |

TABLE 4

Product data (inventive examples)

| Final powder | Product name | | |
|---|---|---|---|
| | IE 1 | IE 2 | IE 3 |
| MFR$_2$ [g/10 min] | 0.25 | 0.22 | 0.22 |
| XS [wt.-%] | 2 | 3.6 | 2 |
| C2 content [%] | — | 1.4 | — |
| C4 content [%] | 2.1 | — | 2.4 |
| Pellet MFR$_2$ [g/10 min] | 0.28 | 0.18 | 0.23 |

All the polymers were compounded at 270-300° C. with a twin screw extruder. All polymers were formulated: Irganox 168=1000 ppm; Irganox 1010=2000 ppm; Irganox 1330=5000 ppm; calcium stearate=700 ppm and 2 wt.-% master batch based on pigmented random polypropylene copolymer with 0.25 w.-% Cinquasia Gold (from Ciba)= quinacridone type β-nucleating agent

TABLE 5

Properties (comparative examples)

| | Product name | | | |
|---|---|---|---|---|
| | CE 1 | CE 2 | CE 3 | CE 4 (RA7050) |
| Tm [° C.] | 144/155 | 142/155 | 149/162 | 132/146 |
| beta-content [%] | 73 | 78 | 73 | 80 |
| Rheology at 200° C. | | | | |
| SHI (0/50) | | | | 9.9 |
| PI | | | | 3.8 |
| Injection molding | | | | |
| Flexural Modulus [Mpa] | 1210 | 1250 | 1090 | 820 |
| NIS (23° C.) [kJ/m$^2$] | 43 | 44 | 86 | 60 |
| NIS (0° C.) [kJ/m$^2$] | | | | 3 |
| NIS (−20° C.) [kJ/m$^2$] | 2.5 | 2.1 | 5.5 | |
| Compression molding | | | | |
| Flexural Modulus [Mpa] | 1520 | 1510 | 1420 | 930 |
| NIS (23° C.) [kJ/m$^2$] | 12.3 | 11.5 | 46 | 13 |
| NIS (0° C.) [kJ/m$^2$] | | | | 1.9 |
| NIS (−20° C.) [kJ/m$^2$] | 2.5 | 2.3 | 4.0 | |
| Pipe testing | | | | |
| Falling weight at 0° C., H50 | 0.5 | 0.6 | >4 | 1 |
| Pressure test for pipe at 16 MPa at 20° C. [h] | 1340 | 600 | 100 | 20 |
| Pressure test for pipe at 4.5 MPa at 95° C. [h] | 9000 | 8300 | 26 | 3000 |

TABLE 6

Properties (inventive examples)

| Product name | IE 1 | IE 2 | IE 3 |
|---|---|---|---|
| Tm [° C.] | 151/164 | 148/165 | 149/163 |
| beta-content [%] | 69 | 85 | 85 |
| Rheology at 200° C. | | | |
| SHI (0/50) | 10 | 11.7 | 10.2 |
| PI | 3.7 | 3.9 | 3.8 |
| Injection molding | | | |
| Flexural Modulus [Mpa] | 1380 | 1190 | 1340 |
| NIS (23° C.) [kJ/m$^2$] | 42 | 84 | 80 |
| NIS (0° C.) [kJ/m$^2$] | — | 6.5 | 7.8 |
| NIS (−20° C.) [kJ/m$^2$] | 3.9 | 3.2 | 6 |
| Compression molding | | | |
| Flexural Modulus [Mpa] | 1760 | 1350 | 1600 |
| NIS (23° C.) [kJ/m$^2$] | 10.5 | 12.7 | 10.4 |
| NIS (−20° C.) [kJ/m$^2$] | 3.6 | 3 | 4 |
| Pipe testing 32 mm/3 mm pipe | | | |
| Falling weight at 0° C., H50 [m] | 1.5 | — | — |
| Pressure test for pipe at 16 MPa at 20° C. [h] | 1460 | — | — |
| Pressure test for pipe at 4.5 MPa at 95° C. [h] | 11088 | — | — |

We claim:

1. Polypropylene composition comprising
   (a) an isotactic propylene homopolymer (A) and
   (b) a random propylene-butene copolymer (B) with a 1-butene content up to 8 wt.-% or a random propylene-ethylene copolymer (B') with an ethylene content not exceeding 3.0 wt %
   wherein the amount of β-modification of the polypropylene composition is at least 50%.

2. Polypropylene composition according to claim 1, wherein the isotactic propylene homopolymer (A) has MFR$_2$ (230° C.) of not more than 5.0 g/10 min measured according to ISO 1133.

3. Polypropylene composition according to claim 1, wherein the copolymer (B) or copolymer (B') has MFR$_2$ (230° C.) of not more than 5.0 g/10 min measured according to ISO 1133.

4. Polypropylene composition according to claim 1, wherein the polypropylene composition comprises
   (a)
      (i) 30 to 70 wt.-% propylene homopolymer (A) based on homopolymer (A) and random copolymer (B) (Homopolymer (A)/(homopolymer (A)+copolymer (B)) and
      (ii) 70 to 30 wt.-% random propylene-butene copolymer (B) based on homopolymer (A) and random copolymer (B) (homopolymer (A)/(homopolymer (A)+copolymer (B))
   or
   (b)
      (i) 30 to 70 wt.-% propylene homopolymer (A) based on homopolymer (A) and random copolymer (B') (homopolymer (A)/(homopolymer (A)+copolymer (B')) and
      (ii) 70 to 30 wt.-% random propylene-butene copolymer (B) based on homopolymer (A) and random copolymer (B) (homopolymer (A)/(homopolymer (A)+copolymer (B)).

5. Polypropylene composition according to claim 1, wherein the polypropylene composition comprises up to 5.0 wt.-% comonomer, preferably up to 5.0 wt.-% 1-butene or ethylene.

6. Polypropylene composition according to claim 1, wherein the polypropylene composition has a xylene soluble fraction according to ISO 6427 of less than 5 wt.-%.

7. Polypropylene composition according to claim 1, wherein the polypropylene composition has MFR$_2$ (230° C.) of not more than 0.8 g/10 min measured according ISO 1133.

8. Polypropylene composition according to claim 1, wherein the polypropylene composition in a compression molded state has a flexural modulus measured according to ISO 178 of at least 1300 Mpa.

9. Polypropylene composition according to claim 1, wherein the polypropylene composition in a compression molded state has an impact strength measured according the Charpy impact test (ISO 179 (1 eA)) at 23° C. of at least 9.5 kJ/m² and/or an impact strength measured according the Charpy impact test (ISO 179 (1 eA)) at −20° C. of at least 2.5 kJ/m².

10. Use of a polypropylene composition according to claim 1 for the manufacture of pipes or cables.

11. Use of a polypropylene composition according to claim 1 as part of a pipe or a cable.

12. Polypropylene composition according to claim 1, wherein the polypropylene composition has been produced in a multistage process.

13. Polypropylene composition according to claim 12, wherein the propylene homopolymer (A) is produced in a loop reactor and subsequently the copolymer (B) or the copolymer (B') is produced in a gas phase reactor.

14. A process for the manufacture of a polypropylene composition comprising,
   providing a polypropylene composition having
   (a) an isotactic propylene homopolymer (A) and
   (b) a random propylene-butene copolymer (B) with a 1-butene content up to 8 wt.-% or a random propylene-ethylene copolymer (B') with an ethylene content not exceeding 3.0 wt %
   wherein the amount of β-modification of the polypropylene composition is at least 50%; and
   wherein the polypropylene composition is produced in a multistage process and subsequently treated with a β-nucleating agent.

15. Process according to claim 14, wherein the propylene homopolymer (A) is produced in a loop reactor and subsequently the copolymer (B) or the copolymer (B') is produced in a gas phase reactor.

16. Pipe or cable comprising, a polypropylene composition having
   (a) an isotactic propylene homopolymer (A) and
   (b) a random propylene-butene copolymer (B) with a 1-butene content up to 8 wt.-% or a random propylene-ethylene copolymer (B') with an ethylene content not exceeding 3.0 wt %
   wherein the amount of β-modification of the polypropylene composition is at least 50%.

17. Pipe according to claim 16, wherein the pipe is a pressure pipe.

18. Process for the manufacture of a pipe or cable comprising,
   providing a polypropylene composition having
   (a) an isotactic propylene homopolymer (A) and
   (b) a random propylene-butene copolymer (B) with a 1-butene content up to 8 wt.-% or a random propylene-ethylene copolymer (B') with an ethylene content not exceeding 3.0 wt %
   wherein the amount of β-modification of the polypropylene composition is at least 50%; and
   wherein a melt of the polypropylene composition is extruded and subsequently formed to a pipe or surrounds a conductor(s).

* * * * *